UNITED STATES PATENT OFFICE.

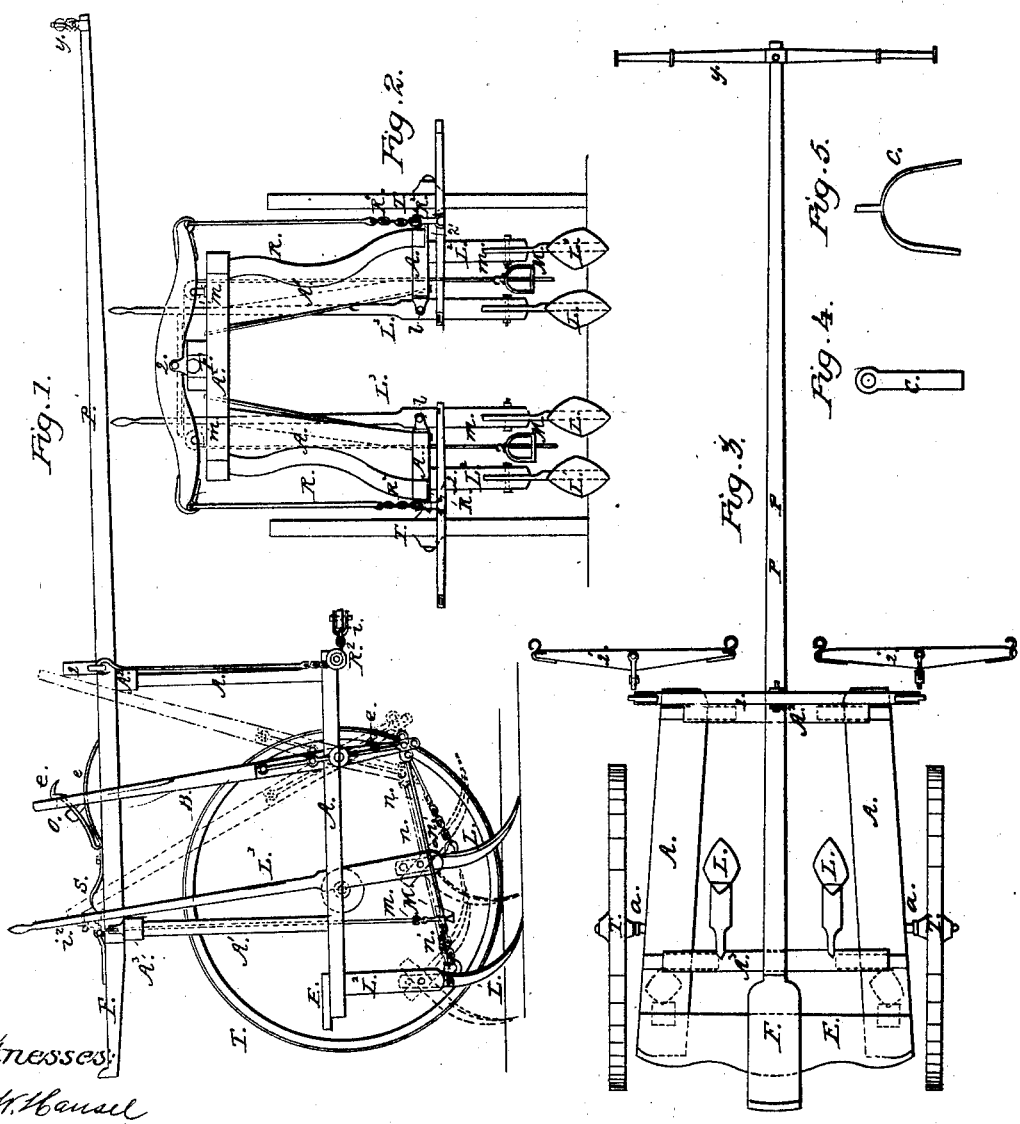

JOHN KIRKMAN, OF PEORIA, ILLINOIS.

IMPROVEMENT IN CULTIVATORS.

Specification forming part of Letters Patent No. 45,615, dated December 27, 1864.

*To all whom it may concern:*

Be it known that I, JOHN KIRKMAN, of the city and county of Peoria, and State of Illinois, have invented a new and Improved Cultivator; and I do hereby declare the following to be a full and exact description of the same, reference being had to the accompanying drawings, making part of this specification, in which—

Figure 1 is a side elevation of my improved cultivator, one of the carrying-wheels being removed to exhibit the working parts of the machine. Fig. 2 is front end elevation thereof. Fig. 3 is a plan of the same. Figs. 4 and 5 are diagrams illustrating the neck-yokes, to be hereinafter described.

Similar letters of reference indicate corresponding parts in the several figures.

This machine pertains to that class of cultivators which are commonly drawn by two horses, one working on each side of the row, and in which the plows are arranged to cultivate at both sides of the growing plants simultaneously.

The principal object of the invention is to produce novel and improved devices for sustaining the plows in an elevated position when their operation is to be suspended, retaining them in their working position, and preventing injury to the parts in consequence of the plow coming in contact with immovable obstacles. A further object is to provide a novel way of supporting the tongue of the machine in an elevated position in order that it may pass over corn of any height without injuring the same, the frame of the machine to which the tongue is attached being also adapted for the same purpose, all as will be hereinafter fully explained.

In order that others skilled in the art to which my invention appertains may be enabled to fully understand and use the same, I will proceed to describe its construction and operation.

In the accompanying drawings, A A may represent converging beams which are supported by axles $a$ $a$, upon which the respective wheels T T are journaled.

A' represents uprights which rise from the beams A A, at points near the front and rear ends thereof, the opposite uprights being connected at their tops by cross-bars $A^2$ $A^3$ respectively.

P represents the tongue or pole, secured to the cross-bars $A^2$ $A^3$, as shown clearly in Fig. 3.

The standards are to be of such height that when the machine is cultivating the cross-bars $A^2$ $A^3$ will pass over the tops of the plants without coming in contact therewith, as well when the corn has reached its full height as at any time during its growth, and the intervening space between the beams A A and standards A' A' is to be of sufficient capacity to adapt the machine to straddle the plants, and thus pass along the row in such manner as to avoid breaking or otherwise injuring the plants by brushing.

It will be seen that the tongue P, being supported at its rear end upon the cross-bars $A^2$ $A^3$, will occupy a position at a greater or less height above the backs of the horses when the machine is in its proper working position. Hence to obtain an effectual attachment between the horses and tongue I employ bows C C, the construction of which is clearly shown in Figs. 4 and 5. These bows are suspended from the respective ends of a neck-yoke, $y$, which may be attached to the forward extremity of the tongue by means of a universal joint, $y'$, and they are applied to and embrace the top or upper portion of the necks of the animals, said yokes being placed beneath and securely fastened in position by the hames.

Q represents a transverse bar pivoted upon the tongue P, and providing means for the suspension of rods R R and chains R' R', which latter work over loose pulleys $R^2$ $R^2$, and have attached to their lower ends single-trees Q' Q', to which the traces of the respective horses are hitched. This manner of attaching the single-trees is adopted for the purpose of equalizing the draft.

The above-described method of locating the tongue and supporting the same at its forward end adapts it to conform to the increased height of my improved cultivator without interfering with its efficiency as a draft medium.

L L L' L' represent respectively the inner and outer plows. The shanks of the outer plows, L' L', are pivoted in standards $L^2$ $L^2$, secured to and depending from the rear ends of the beams A A, and the shanks of the inner plows, L L, are pivoted in standards $L^3 L^3$, which in turn are pivoted to lugs $l\ l$, and said standards $L^3$ are connected at their upper ends by a bar, $l^2$, which adapts the standards to be adjusted so as to vary the relative positions of the plows L L.

Attached to the center of the bar $l^2$ are chains $m\ m$, and suspended from the ends of the latter are stirrups or loops M M, for the reception of the feet of the driver. The chains $m\ m$ work over pulleys $m'\ m'$, and the driver by bearing down with his foot in one or other of the stirrups M M can thus with facility throw the plows L L' in a lateral direction, either to prevent uprooting irregular plants or avoid obstructions. The plows L' L' are braced and connected to pivoted arms $c$ by braces which are composed of rods $n$ and chains $n'$, whereby the plows may be adjusted at the required depth to which it is desired to have them work. Of the arms $c$ there are four, two being supported at the respective sides of each beam A and adapted to turn simultaneously with short shafts journaled in suitable bearings in said beams. The two inner arms $c$ are rigidly attached to levers B, which rise in converging positions at either side of the tongue P, and which are connected or joined at top at a point somewhat above said tongue.

E E represent a spring against which rest the upper ends of the levers B B when the plows are in working position, a thumb-screw, $o$, serving to securely retain the levers in this position, when desired. The turning of this thumb-screw $o$ will permit the levers B B to be swung backward at their upper ends, which imparts a forward movement to the levers $c$, and the latter, (when thus turned forward,) acting through the rods $n$ and chains $n'$, throw the plows to an elevated position, this operation being readily effected by the driver when it is desired to suspend the operation of the machine. When the levers B B are turned back a spring, S, is depressed and passed over, after which the spring assumes its original position and serves to prevent the levers from returning to their forward position at an unsuitable time.

As the resisting force presented to the plows while the machine is in operation is transmitted to the levers B B, it is of course necessary that the elastic power of the spring E E be such as to withstand the force applied to these levers under ordinary circumstances; but in the event of any or all of the plows coming in contact with an immovable obstacle the spring E E will yield to the increased pressure and allow the levers B B to turn forward upon their pivots in due time to permit the plows to pass over the obstructing body without injury, and when the levers B B are thus released the plows will readily turn upon the pivots by which they are attached to their several standards, whereby an additional security against damage is provided. The various positions which the levers B B and plows L L' are capable of assuming are illustrated by the blue and dotted lines in Fig. 1. This adaptability of the levers and plows to turn upon their pivots may be advantageously employed by the driver in disengaging any weeds, stubble, and the like, which may clog the plows, as by any suitable connection he may be enabled to throw the levers in front of the springs E E and then retract them behind the same without leaving his seat.

E represents a seat mounted upon the rear ends of the beams A A, and which the driver may occupy when the small plants are being cultivated, the location of this seat enabling the driver when sitting upon it to have a clear unobstructed view of the plants for a sufficient distance in advance to allow him to shift the plows in due time to avoid uprooting irregular plants. This seat is adapted to be readily removed or be turned aside to afford the driver free access to the plows. When large plants are being cultivated the seat E is removed and a seat, F, employed in its stead. The seat F is securely attached to the rear end of the tongue P.

The stirrups M M may be suspended in a higher or lower position by the chains $m\ m$, so as to bring them within convenient reach of the feet of the driver when he is sitting on either of the seats E F.

Having thus described my invention, the following is what I claim as new and desire to secure by Letters Patent:

1. The springs E E S, and thumb-screw $o$, employed in combination with the levers B B, to retain the plows in either a working or an elevated position and secure the same against liability to injury by contact with immovable bodies, as set forth.

2. In a machine constructed in the manner herein described, supporting the neck-yoke $y$ and the end of the tongue by means of bows C, or their equivalents, fitting upon or over the top or upper part of the horse's neck, substantially as and for the purpose set forth.

JOHN KIRKMAN.

Witnesses:
R. P. JOHNSTON,
DAVID McCULLOCH.